March 7, 1939.  P. R. SANDWELL  2,150,132
DRYING CYLINDER
Filed June 1, 1937   6 Sheets-Sheet 1
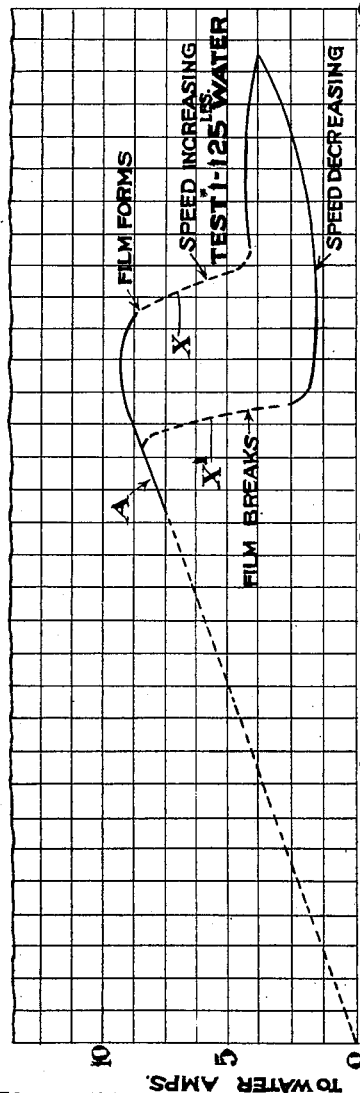
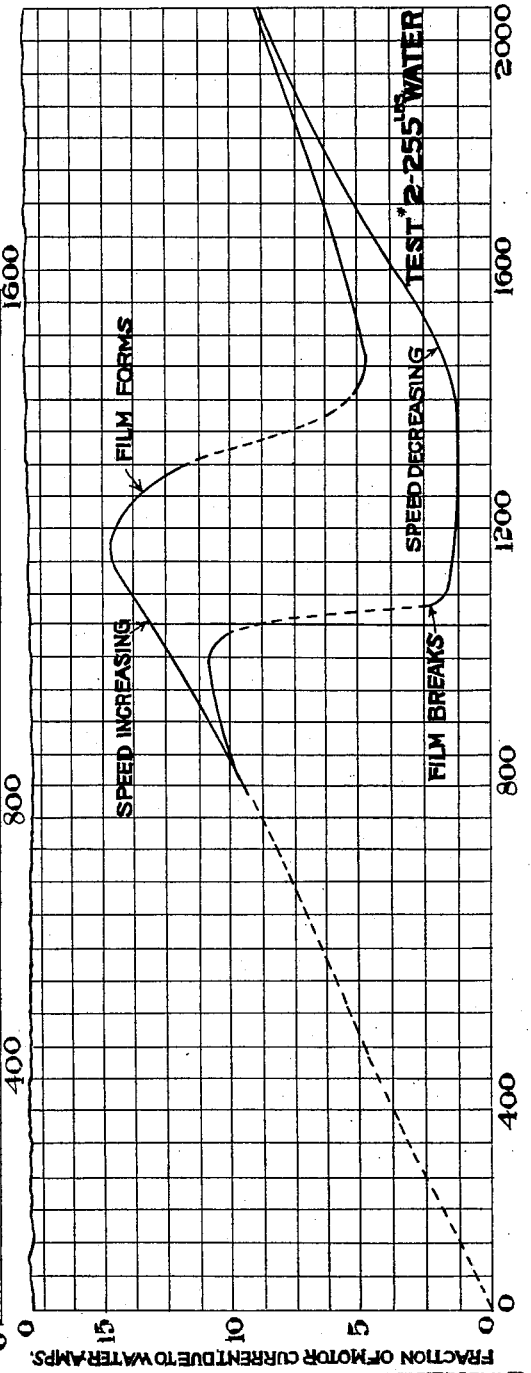
INVENTOR
P. R. SANDWELL
BY J. D. O'Connell
ATTORNEY March 7, 1939.　　　P. R. SANDWELL　　　2,150,132
DRYING CYLINDER
Filed June 1, 1937　　　6 Sheets-Sheet 2

INVENTOR
P.R.SANDWELL
BY J.D.O'Connell
ATTORNEY

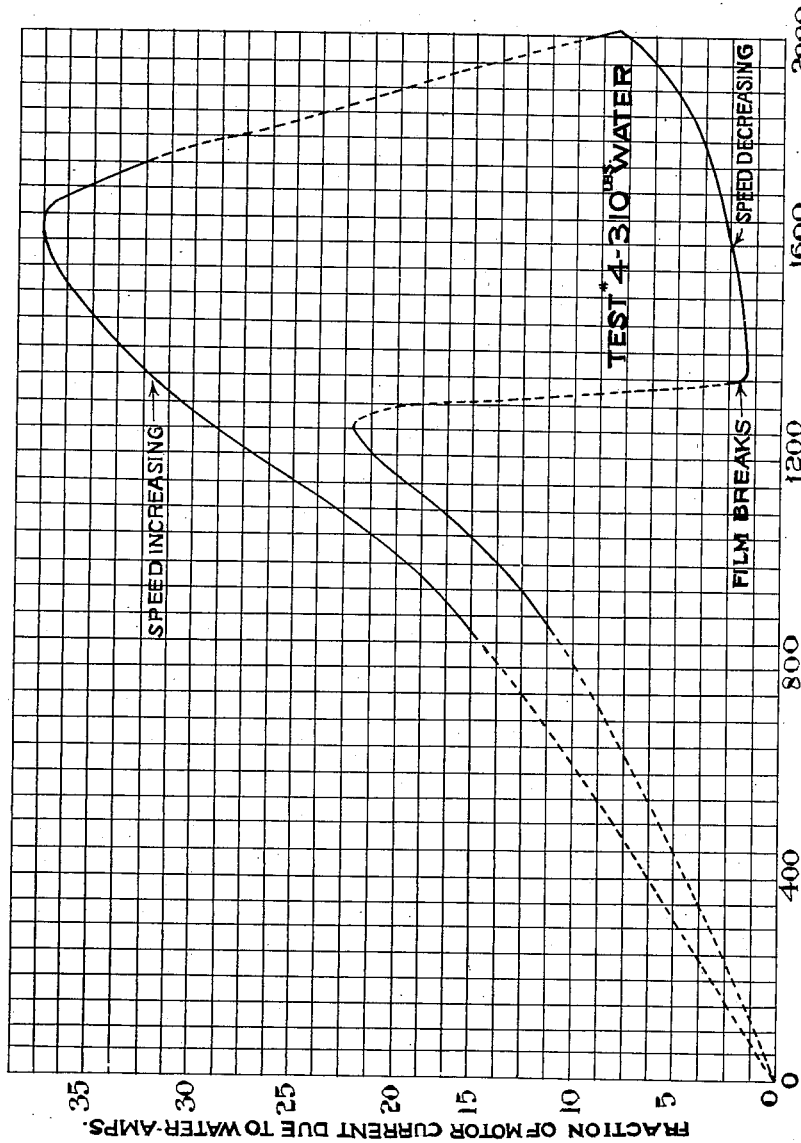

March 7, 1939.  P. R. SANDWELL  2,150,132
DRYING CYLINDER
Filed June 1, 1937  6 Sheets-Sheet 4
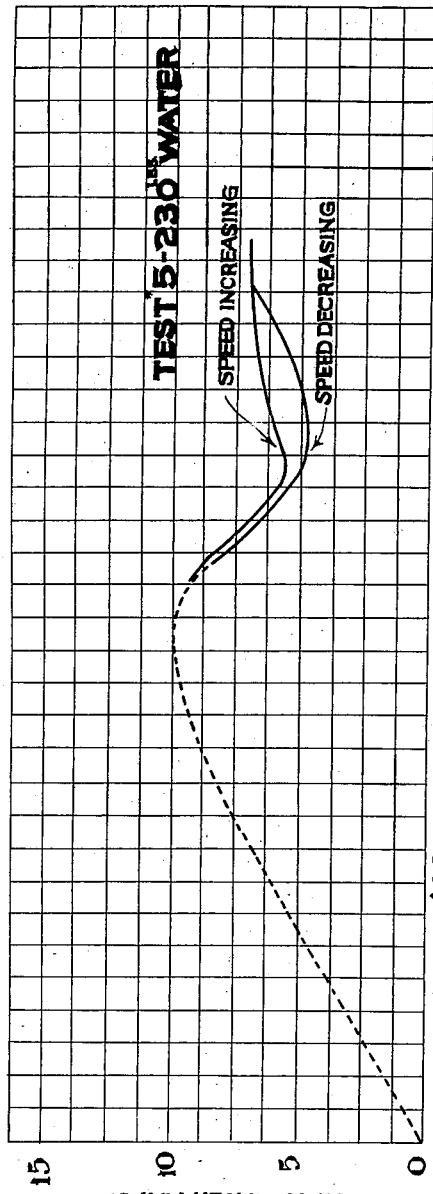
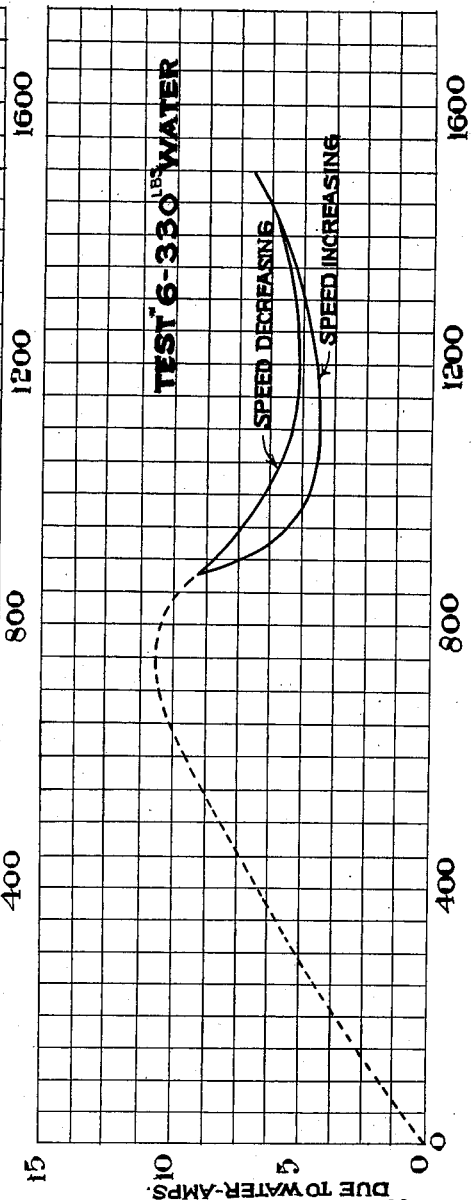
INVENTOR
P. R. SANDWELL
BY J. D. O'Connell
ATTORNEY

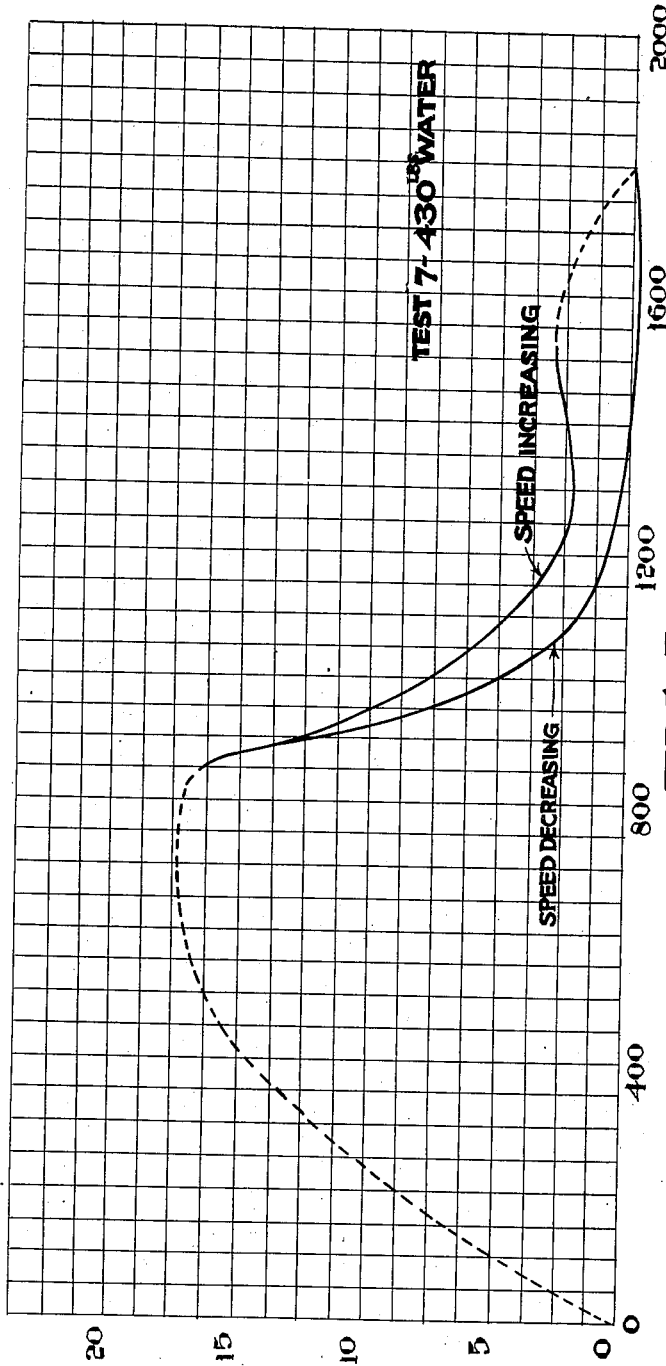

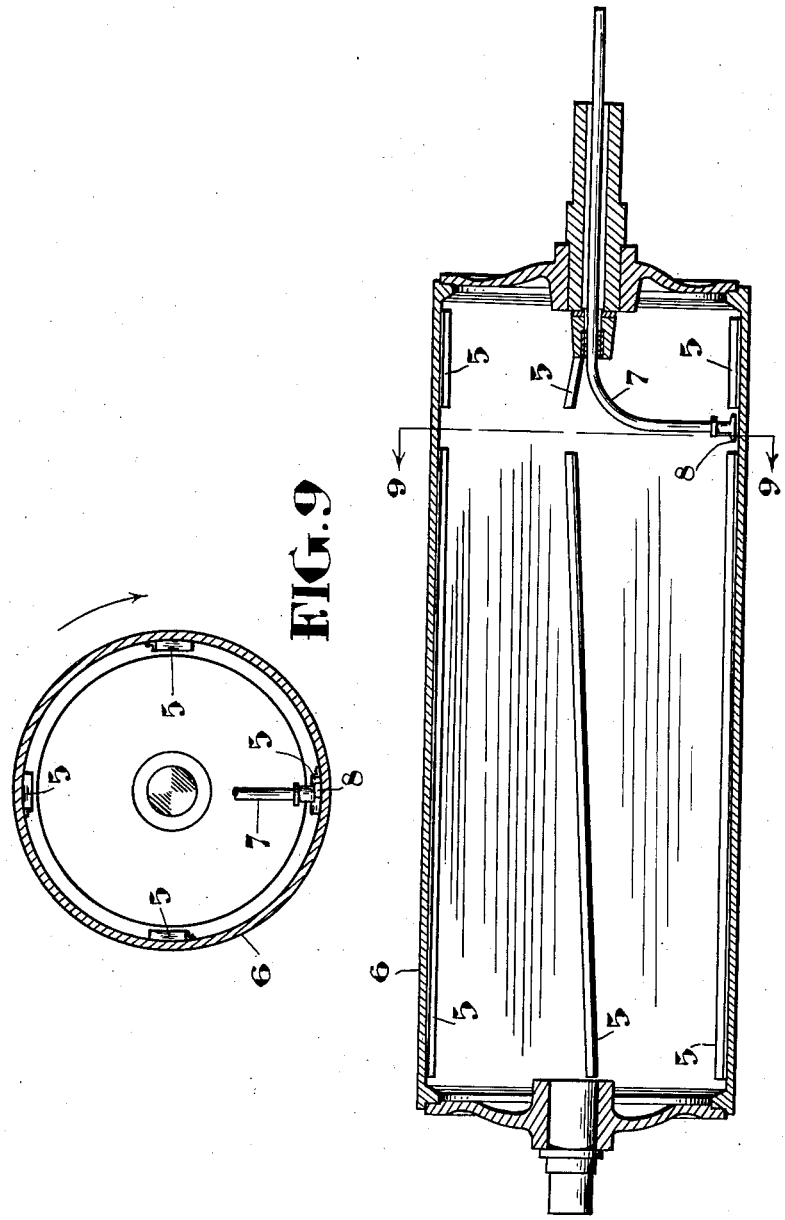

/ Patented Mar. 7, 1939

2,150,132

UNITED STATES PATENT OFFICE 2,150,132

DRYING CYLINDER

Percy R. Sandwell, Montreal, Quebec, Canada, assignor to Dominion Engineering Works Limited, Montreal, Quebec, Canada Application June 1, 1937, Serial No. 145,814

5 Claims. (Cl. 34—4)

This invention relates to the removal of condensate from the drying cylinders of a paper making machine. Its principal objects are (1) to decrease the amount of power required to drive the dryer cylinders; (2) to ensure a constant dryer load over a wide speed range having practically no upper limit; and (3) to increase the rate of heat transfer through the walls of the cylinders.

From the time when drying cylinders were first used on paper-making machines condensate removal has been a problem. Its importance has increased enormously with the introduction of newsprint machines running at speeds in excess of 1000 feet per minute. During the last decade many systems for removing condensate have been invented. All of them have economy of steam consumption as their main objective. The more recent ones endeavour to curtail the power consumption of the dryer section as well. It is generally recognized that both lower steam and power consumption can be realized if the amount of water in the dryer can be kept at a minimum.

Since a certain period must elapse between the time when the steam condenses and the time when it is expelled through the drainage device, there will always be an accumulation of water in the dryer. Its behaviour is interesting.

As a dryer revolves its inside surface tends to carry the water with it. This tendency is opposed by the pull of gravity on the water. Once the water is set in motion a third force acts upon it: centrifugal force, which increases in importance with the speed of the water. The speed at which the centrifugal force balances the force of gravity can be found from the relationship:

$$V = \sqrt{gr}$$

Where:

$v$ = velocity in ft./sec.

$g$ = the acceleration of gravity in ft./sec.$^2$.

$r$ = the inside radius of the dryer in feet.

For a 60″ diameter dryer this speed is about 550 feet per minute.

Suppose a dryer is revolving at some speed in excess of this "balancing" speed, and suppose a certain amount of water is deposited within it. The dryer will pull the water up its side to a point where the grade becomes steep enough for the water to fall back. At each revolution of the dryer the water is moved a little more quickly until its speed approaches the "balancing" value, where it will be carried right around the inside of the dryer. Once this point has been passed the water ceases to roll back and forms a smooth continuous skin or film around the inside of the dryer.

The same effect can be obtained if a dryer is started from rest with water in it. As the speed increases the water is carried farther and farther up the side of the dryer until the "balancing" speed is reached. This "balancing" speed is always less than the surface speed of the dryer and depends directly on the amount of water present. The greater the amount of water, the greater the slip between the water and the shell, and the higher must be the speed of the dryer to bring the water to its "balancing" speed. When the speed of the dryer is decreased the film of water does not break at the same speed at which it formed but at a speed considerably less.

This behaviour of the water has a marked effect on the amount of power required to drive the cylinder. During the period before formation of the film, energy is expended in lifting the water up the side of the dryer and in overcoming the drag of the water as it flows back to the bottom. The higher the water is carried the more power is required. As soon as the film forms the power drops considerably and increases only slightly during any further increase in speed. If the speed of the dryer is decreased, the power consumption becomes excessive as soon as the film breaks.

Within a range of speeds near the point of film formation and destruction, there is a period of instability during which the power consumption fluctuates considerably. If the operating speed of the paper machine is within this zone, there is a continual fluctuation in the power required and, consequently, a good deal of surging in the driving motors and gearing.

Most modern news machines running at speeds of from 1100 to 1500 feet per minute, speeds within the zones described, are subject to fluctuating motor loads, uneven and excessive gear tooth loads, fluctuating sheet tensions and other undesirable and harmful conditions which greatly increase maintenance and operating costs.

The desirability of removing the previously mentioned zones of instability from the zones of operating speeds is apparent. In order to remove them to speeds in excess of operating speeds it would be necessary to carry a much greater quantity of condensate than is usual. The decreased rate of heat transfer and the excessive power requirements which such a change would bring about exclude this method. Since the water should form a film at 550 feet per minute, the practical remedy is to decrease the slip between the water and the dryer shell.

According to the present invention the behaviour and evacuation of the water contained in the drying cylinders is so controlled that the period of instability during which the power consumption fluctuates or becomes excessive is eliminated from the range of speeds at which the dryer cylinders are operated. This is accomplished by (1) decreasing the slip between the water and the shell of the dryer cylinder so that the water forms a film around the inside of the shell at a balancing speed given by the relationship $$V = 320\sqrt{R}$$

where R is the inside radius of the cylinder, and (2) removing the water by means of a stationary syphon pipe having its intake end positioned sufficiently close to the inside bottom surface of the shell to scoop up the water as the shell travels around the pipe. The establishment of film conditions at the relatively low balancing speeds contemplated by this invention substantially lowers the power consumption in addition to eliminating instability within the operating range of the drying cylinders. The use of a syphon pipe and the necessary pressure differential ensures efficient evacuation of the water at operating speeds under the conditions obtaining when film conditions are established at the relatively low balancing speed made possible by this invention.

Proceeding now to a more detailed description of this invention reference will be had to the accompanying drawings, in which—

Figs. 1 to 4 inclusive are curve diagrams illustrating the normal relationship between the speed, water conditions, and power consumption of a dryer cylinder.

Figs. 5 to 7 inclusive are curve diagrams showing the manner in which the speed-water-power relationship is modified when the behaviour and evacuation of the water in the dryer cylinder is controlled in accordance with the principles of the present invention.

Fig. 8 is a longitudinal sectional view of a dryer cylinder equipped with slip retarding baffles and syphon pipe representing a practical application of the invention.

Fig. 9 is a transverse sectional view taken substantially along the line 9—9 of Fig. 8.

Figure 3:
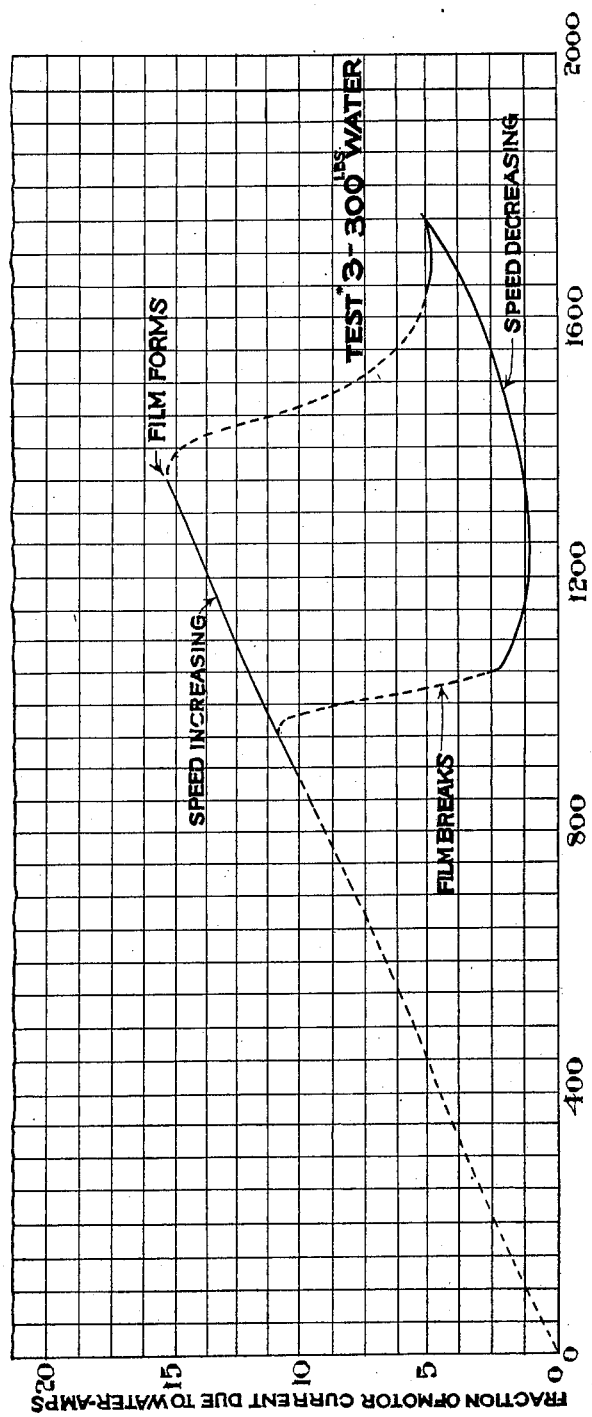

The graphs of Figs. 1 to 4 are plotted from data obtained in a number of tests carried out on a dryer cylinder 260 inches long and 60 inches in diameter. In each figure the ordinates represent the fluctuating power consumption in amperes due to water conditions and the abscissae represent the surface speed of the dryer cylinder in feet per minute.

Fig. 1 shows that with 125 lbs. of water in the dryer cylinder film conditions were established at a speed of approximately 1130 feet per minute. The film broke when the speed was reduced to approximately 980 feet per minute. The dotted portion X of the curve A indicates the rapid drop in power which followed the establishment of film conditions while the dotted portion X' indicates the rapid rise in power consumption which occurred when the surface speed of the dryer was reduced to the film breaking point. As will be evident from this graph the power consumption fluctuates considerably within a range of speeds near the points of film formation and destruction.

Figs. 2, 3 and 4 indicate the results obtained when the amount of water in the dryer cylinder was increased to 255 lbs. in the case of Fig. 2; to 300 lbs. in the case of Fig. 3; and to 510 lbs. in the case of Fig. 4.

The graphs of Figs. 5, 6 and 7 show the results obtained with different quantities of water in the dryer when the slip between the water and the dryer shell is decreased in accordance with the invention. In the latter instance the power-water-speed relationship is modified so that the balancing speeds at which film conditions are established are reduced to speeds below 800 feet per minute with a consequent reduction of power consumption within the operating speed zone of the dryer.

According to the preferred embodiment of this invention the slip between the water and the dryer shell is reduced to a minimum by fastening paddles 5 to the inside of the dryer shell 6 as shown in Figs. 8 and 9. These paddles work in conjunction with a syphon pipe 7 which is preferably equipped with a scoop-type tip 8 of the kind disclosed in United States Patent 1,919,416 dated July 25, 1933. The paddles are placed at a slight angle to the longitudinal axis of the shell so that, by taking advantage of any relative motion between the water and shell, they serve to force the water toward the scoop or tip 8 of the syphon pipe. The use of these paddles results in film conditions being established at speeds below 800 feet per minute with consequent lowering of power consumption and elimination of zones of instability as graphically indicated in Figs. 5 to 7 inclusive. The paddles also have the effect of substantially decreasing the amount of condensate carried in the dryer as compared with ordinary practice. After the installation of the paddles this amount was found to vary from 20 to 50 lbs. for a range of surface speeds of from 800 to 1800 feet per minute. Before the paddles were installed the amount of water carried in the dryer varied from 100 to 200 lbs. This reduction in the amount of water carried in the dryer is important in that it gives an increased rate of heat transfer through the walls of the dryer shell.

The use of the syphon pipe 7 in conjunction with the paddles 5 is an important feature of the invention in that it provides, in combination with the necessary pressure differential, efficient evacuation of the water under the conditions obtaining when film conditions are established at the low balancing speed characteristic of this invention.

The principal advantages to be expected from the use of the present invention may be briefly summarized as follows:

1. Decreased power consumption which brings with it the following benefits:
    (a) The use of smaller motors, reduction gear units, and dryer gears in a new machine.
    (b) Less maintenance on existing machines if present speeds are maintained.
    (c) Higher operating speeds on existing machines for the same power consumption as at present.

2. Constant dryer load over wide range of speeds with no limit to the upper end of the range. This means:
    (a) Constant sheet tension with consequent reduced risk of snap-offs in the dryer section.
    (b) Reduced wear on the gearing.
    (c) Elimination of surging in the driving motors.

3. Increased rate of heat transfer because of the smaller amount of water in the dryer, giving:

(a) Increased dryer capacity for a given dryer area.

(b) More even drying across the sheet.

(c) Smaller temperature differences between the steam and the shell, which allows a lower steam pressure for a given shell temperature.

Having described the principles of this invention and one practical embodiment thereof, it will be understood that various modifications are contemplated within the scope and spirit of the appended claims. For example, the paddles may be replaced by other suitable slip retarding means capable of giving the same effect in respect to lowering the balancing speed.

Having thus described my invention, what I claim is:

1. The method evacuating water from a steam heated rotary dryer cylinder which comprises retarding slippage between the water and the cylinder so that the water forms a film around the inside of the cylinder at a balancing speed substantially below the speed at which film formation would ordinarily be established and scooping the water from the lower portion of the cylinder by the aid of a stationary syphoning device through which the water is expelled as the cylinder rotates relative to said device.

2. A steam heated rotary drying cylinder of the character described provided with means on its inner circumferential surface for decreasing slippage between the cylinder and the water contained therein so that the water forms a film around the inside of the cylinder when the latter is rotating at a speed substantially below the speed at which such film conditions would ordinarily be established and means for removing the water from said cylinder comprising a stationary syphoning device having its intake end arranged close to the inside bottom surface of the cylinder so that the water is forced outwardly through said device during rotation of the cylinder.

3. A steam heated rotary drying cylinder of the character described equipped with means on its inner surface for retarding slippage between the cylinder and the water contained therein so that the water forms a film around the inside of the cylinder at speeds substantially below the speeds ordinarily required to establish such film conditions and means for removing the water from said cylinder comprising a stationary syphon pipe having its intake end disposed within said cylinder and provided with a scoop-like tip submerged in the water covering the lower inside surface of the cylinder.

4. A rotary steam heated dryer cylinder of the character described provided on its inner surface with longitudinally extending paddles arranged to decrease slippage between the cylinder and the water contained therein so that the water forms a film around the inside of the cylinder at a balancing speed substantially lower than the balancing speed ordinarily required to establish such film conditions and stationary means for syphoning the water from the inside bottom surface of the cylinder as the latter rotates relative to said means.

5. A rotary steam heated dryer cylinder as set forth in claim 4 in which the paddles are inclined to force the water toward the syphoning means.

PERCY R. SANDWELL.